Figure 3:
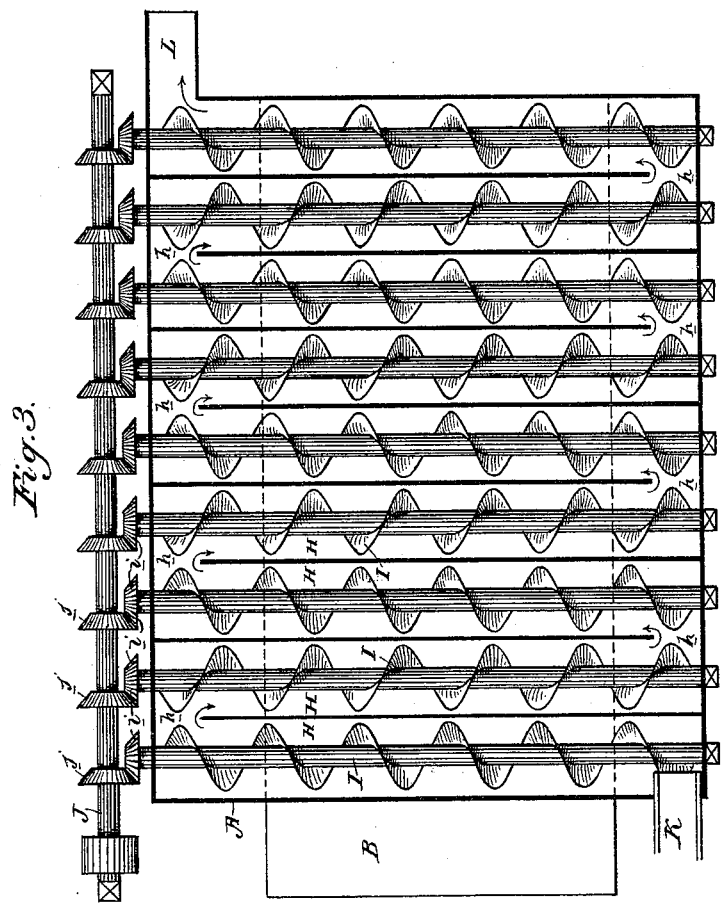

(No Model.) 2 Sheets—Sheet 1.
L. BORLAND.
GRAIN DRIER.
No. 403,411. Patented May 14, 1889.
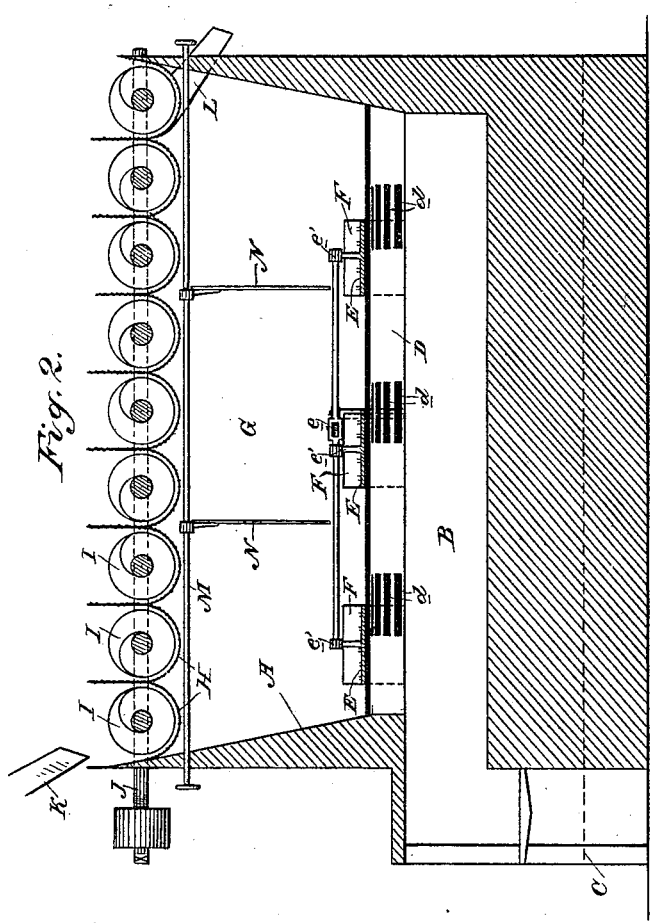
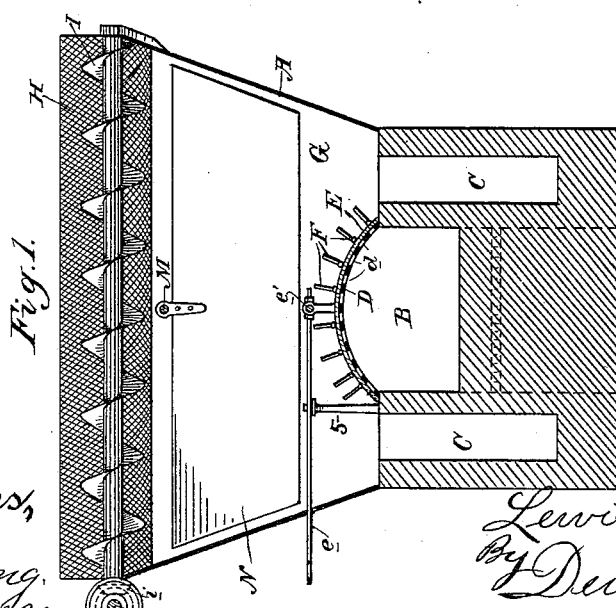
Witnesses, Inventor,
 Lewis Borland,
By Dewey & Co.
Att'ys (No Model.) 2 Sheets—Sheet 2.
L. BORLAND.
GRAIN DRIER.

No. 403,411. Patented May 14, 1889.

Witnesses,
Geo. H. Strong.

Inventor,
Lewis Borland
By Dewey & Co.
atty

UNITED STATES PATENT OFFICE.

LEWIS BORLAND, OF SAN FRANCISCO, CALIFORNIA.

GRAIN-DRIER.

SPECIFICATION forming part of Letters Patent No. 403,411, dated May 14, 1889.

Application filed May 26, 1888. Serial No. 275,204. (No model.)

*To all whom it may concern:*

Be it known that I, LEWIS BORLAND, of the city and county of San Francisco, State of California, have invented an Improvement in Grain-Driers; and I hereby declare the following to be a full, clear, and exact description of the same.

My invention relates to that class of grain-driers in which the grain is advanced throughout its course in a series of perforated casings by rotating augers therein, being subjected to an uprising body of heated air, which passes through the perforated casings and the grain contained therein; and my invention consists in the constructions and combinations which I shall hereinafter fully describe and claim.

Figure 1 is a vertical cross-section. Fig. 2 is a vertical longitudinal section. Fig. 3 is a plan.

A is the shell of the drier, having formed in its base the heating-chamber B and the man-openings C on each side, to provide for the entrance of workmen. The top of the heating-chamber is formed with an arch, D, having openings $d$ at intervals, over which fit the controlling valves or dampers E. These slide on top of the arch and are actuated by a lever, $e$, pivoted to a post or standard, 5, and attached to a connecting-rod, $e'$. The upper surface of these dampers is provided with plates or flanges F, which are hinged to them, so that their angles may be varied. These plates act in a measure to distribute the heat as it first passes up into the hot-air chamber G above. In the upper portion of the hot-air chamber are arranged transversely of the shell the concaved parallel casings H, which are made of netting of small mesh or of suitably-perforated plates. These casings communicate with each other at opposite ends by means of an opening, $h$, in its division-wall. In each casing is a conveyer, I, adjacent ones having reversed twists or threads, and the whole series is rotated by means of a drive-shaft, J, with bevel-pinions $j$ meshing with bevel pinions $i$ on the conveyer-shafts.

K is the feed-spout, by which the grain is delivered into one end of the first casing, and L is the discharge-spout for the delivery of the grain from the opposite end of the last casing.

Mounted longitudinally in the shell A, just below the casings H, is a rod, M, which is adapted to have a longitudinal movement. Upon this rod are secured the depending division-plates N, which hang down in the hot-air chamber nearly to the arch of the heating-chamber and divide this chamber into compartments, as shown. The position of these plates may be varied by the movement of their supporting-rod.

The operation of my drier is as follows: The course of the grain is back in one casing and forward in the next, being delivered from one to the other throughout the series, and its course is therefore sufficiently extended to allow it to become thoroughly dried. The heated air passes up through the perforated casings and dries the grain. The division of the hot-air chamber into compartments provides for different temperatures, according to the necessities of the operation, for at different stages different heat is required, a greater degree being necessary in the first compartment and diminishing in each of the others. The sliding dampers enable me to regulate the heat in each compartment, and the adjustment of the division-plates provides for the necessary change of position with relation to the dampers, so that more or less heat may be directed to each as required. It will therefore be seen that by this arrangement I have the heat under perfect control, and can subject the grain to the proper drying at different stages of the operation.

Having thus described my invention, what I claim as new, and desire to secure by Letters Patent, is—

In a grain-drier, a shell having a hot-air chamber and a heating-chamber below, in combination with plates in the hot-air chamber, dividing it into compartments, openings between the heating and hot-air chambers for the passage of heated air to the compartments above, dampers controlling the openings, and adjustable flanges or plates on the upper surface of the dampers, substantially as herein described.

In witness whereof I have hereunto set my hand.

LEWIS BORLAND.

Witnesses:
S. H. NOURSE,
H. C. LEE.